US009652512B2

United States Patent
Litherland et al.

(10) Patent No.: US 9,652,512 B2
(45) Date of Patent: *May 16, 2017

(54) SECURE MATCHING SUPPORTING FUZZY DATA

(71) Applicant: International Business Machines Corporation, Armonk, NY (US)

(72) Inventors: Michael B. Litherland, Cleveland Heights, OH (US); Ivan M. Milman, Austin, TX (US); Martin Oberhofer, Bondorf (DE); Donald A. Padilla, Albuquerque, NM (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/493,835

(22) Filed: Sep. 23, 2014

(65) Prior Publication Data

US 2015/0012564 A1 Jan. 8, 2015

Related U.S. Application Data

(63) Continuation of application No. 13/801,976, filed on Mar. 13, 2013.

(51) Int. Cl.
*G06F 17/30* (2006.01)
*G06F 21/60* (2013.01)

(52) U.S. Cl.
CPC .. *G06F 17/30542* (2013.01); *G06F 17/30312* (2013.01); *G06F 21/602* (2013.01)

(58) Field of Classification Search
CPC ......... G06F 17/30587; G06F 17/30542; G06F 17/30469; G06F 17/30536;
(Continued)

(56) References Cited

U.S. PATENT DOCUMENTS 6,590,981 B2 * 7/2003 Fruehauf ................... H04L 9/12
380/260
7,409,406 B2 8/2008 Agrawal et al.
(Continued)

FOREIGN PATENT DOCUMENTS

CN 102033891 A 4/2011

OTHER PUBLICATIONS

Bringer,, J. and H. Chabanne, "Embedding Edit Distance to Enable Private Keyword Search", Human-centric Computing and Information Sciences 2, No. 1 (2012): 1-12. [Also Total 9 pp.].
(Continued)

*Primary Examiner* — James Trujillo
*Assistant Examiner* — Fariborz Khoshnoodi
(74) *Attorney, Agent, or Firm* — Janaki K. Davda; Konrad, Raynes, Davda & Victor LLP

(57) ABSTRACT

Provided are techniques for secure matching supporting fuzzy data. A first bloom filter for a first data element is retrieved, wherein each of the characters in the data element has been encrypted with a beginning offset position of the character and encrypted with an end offset position of the character to produce two encrypted values that are added to the first bloom filter. A second bloom filter for a second data element is retrieved. The first bloom filter and the second bloom filter are compared to determine whether there is a match between the first data element and the second data element.

5 Claims, 8 Drawing Sheets

(58) Field of Classification Search
CPC ............... G06F 17/30946; G06F 17/30; G06F 17/30067; G06F 17/30241; G06F 17/30289; G06F 17/30377; G06F 17/30492; G06F 17/30598; G06F 17/30705; G06F 17/30864; G06F 17/30949; G06F 17/30312
USPC ........................................ 707/780, 736, 754
See application file for complete search history.

(56) References Cited

U.S. PATENT DOCUMENTS

| | | | |
|---|---|---|---|
| 8,966,252 B2* | 2/2015 | Mutka ....................... | H04L 9/32 713/168 |
| 2002/0038421 A1 | 3/2002 | Hamada | |
| 2004/0111600 A1* | 6/2004 | Kaler .................... | H04L 9/0838 713/150 |
| 2005/0055327 A1* | 3/2005 | Agrawal et al. .................. | 707/1 |
| 2006/0034456 A1* | 2/2006 | McGough ............ | H04L 9/0844 380/30 |
| 2006/0200464 A1 | 9/2006 | Gideoni et al. | |
| 2006/0253421 A1 | 11/2006 | Chen et al. | |
| 2012/0272059 A1* | 10/2012 | Shetty et al. .................. | 713/164 |
| 2013/0010950 A1* | 1/2013 | Kerschbaum .................... | 380/30 |
| 2013/0227286 A1* | 8/2013 | Brisson ......................... | 713/168 |
| 2013/0246651 A1* | 9/2013 | Keen ..................... | H04L 45/748 709/238 |
| 2014/0188816 A1* | 7/2014 | Serlet ................ | G06F 17/30303 707/691 |
| 2014/0280342 A1 | 9/2014 | Litherland et al. | |

OTHER PUBLICATIONS

Chuah, M. and W. Hu, "Privacy-aware BedTree Based Solution for Fuzzy Multi-keyword Search over Encrypted Data", Department of Computer Science & Engineering, Distributed Computing Systems Workshops (ICDCSW), 2011 31st International Conference on, pp. 273,281, Jun. 20-24, 2011, doi: 10.1109/ICDCSW.2011.11. [Also Total 9 pp.] (Obtained further info for this NPL from http://ieeexplore.ieee.org/xpl/login.jsp?tp=&arnumber=5961500&url=http%3A%2F%2Fieeexplore.ieee.org%2Fiel5%2F5960724%2F5961342%2F05961500.pdf%3Farnumber%3D5961500].

Deepa, P. L., S.V. Kumar, and Dr. S. Karthik, "Searching Techniques for Encrypted Cloud Data," International Journal of Advanced Research in Computer Engineering & Technology (IJARCET) 1, No. 8 (Oct. 2012): pp. 189. [Also Total 5 pp.].

Kuzu, M., M.S. Islam, and M. Kantarcioglu, "Efficient Similarity Search over Encrypted Data," in Data Engineering (ICDE), 2012 IEEE 28th International Conference on, pp. 1156-1167, IEEE, 2012. [Also Total 12 pp.].

Li, J., Q. Wang, C. Wang, N. Cao, K. Ren, and W. Lou, "Enabling Efficient Fuzzy Keyword Search over Encrypted Data in Cloud Computing," in Proc. of IEEE INFOCOM10 Mini-conference, San Diego, CA, USA, 2009, Total 16 pp.

Liu, L. and J. Gai, "Bloom Filter Based Index for Query over Encrypted Character Strings in Database," in Computer Science and Information Engineering, 2009 WRI World Congress on, vol. 1, pp. 303-307, IEEE, 2009, © 2008 IEEE, [Also Total 5 pp.].

Mell, P., T. Grance, and L. Badger, "Effectively and Securely Using the Cloud Computing Paradigm", NIST, Information Technology Laboratory, Oct. 7, 2009, Total 80 pp.

Mell, P. and T. Grance, "The NIST Definition of Cloud Computing (Draft)", Recommendations of the National Institute of Standards and Technology, Jan. 2011, Total 7 pp.

Wang, J. X. Chen, H. Ma, Q. Tang, J. Li, and H. Zhu, "A Verifiable Fuzzy Keyword Search Scheme over Encrypted Data," Journal of Internet Services and Information Security (JISIS) vol. 2, No. 1/2, pp. 49-58. [Also Total 10 pp.].

Wang, Cong et al., "Achieving Usable and Privacy-assured Similarity Search over Outsourced Cloud Data," in INFOCOM, 2012 Proceedings IEEE, pp. 451-459, IEEE, 2012. [Also Total 9 pp.].

Wikipedia, "Bloom Filter", [online], [Retrieved on Mar. 1, 2013]. Retrieved from the Internet at <URL: http://en.wikipedia.org/wiki/Bloom_filter>, last modified on Mar. 6, 2013, Total 11 pp.

Preliminary Amendment, Sep. 23, 2014, for U.S. Appl. No. 13/801,976, filed Mar. 13, 2013 by M.B. Litherland et al., Total 5 pp. [57.308 (PrelimAmend)].

Dalenius, T. and S.P. Reiss, "Data-Swapping—A Technique for Disclosure Control", (1982). Retrieved from the Internet at <URL: http://www.amstat.org/sections/srms/proceedings/papers/1978_038.pdf>, Journal of Statistical Planning and Inference 6, 1, 73-85. [Also total 4 pp.].

Hernandez, M.A. and S.J. Stolfo, "The Merge/Purge Problem for Large Databases", Proceedings of the 1995 ACM SIGMOD International Conference on Management of Data—SIGMOD '95, 1995, pp. 127-138. [Also total 12 pp.].

Taft, R.L., "Name Search Techniques", Special Report No. 1, Dec. 1970, Total 65 pp.

Wikipedia, "Sha-2", [online], [retrieved on May 29, 2013]. Retrieved from the Internet at <URL: http://en.wikipedia.org/wiki/SHA-2>, Total 9 pp.

English Abstract & Machine Translation for CN102033891A, published on Apr. 27, 2011, Total 9 pp.

International Search Report and Written Opinion, May 16, 2014 for International Application No. PCT/IB2014/058311, Total 9 pp.

UK Examination Report, Oct. 6, 2015, with Application No. GB1515683.9, Total 4 pp.

Office Action 1, Apr. 16, 2015, for U.S. Appl. No. 13/801,976, filed Mar. 13, 2013 by M.B. Litherland et al., Total 33 pp. [57.308 (OA1)].

Response to Office Action 1, Jul. 1, 2015, for U.S. Appl. No. 13/801,976, filed Mar. 13, 2013 by M.B. Litherland et al., Total 15 pp. [57.308 (ROA1)].

Final Office Action, Oct. 23, 2015, for U.S. Appl. No. 13/801,976, filed Mar. 13, 2013 by M.B. Litherland et al., Total 21 pp. [57.308 (FOA)].

Response to Final Office Action, Jan. 20, 2016, for U.S. Appl. No. 13/801,976, filed Mar. 13, 2013 by M.B. Litherland et al., Total 11 pp. [57.308 (RFOA)].

Office Action 3, Apr. 1, 2016, for U.S. Appl. No. 13/801,976, filed Mar. 13, 2013 by M.B. Litherland et al., Total 27 pp. [57.308 (OA3)].

Response to Office Action 3, Jul. 1, 2016, for U.S. Appl. No. 13/801,976, filed Mar. 13, 2013 by M.B. Litherland et al., Total 11 pp. [57.308 (ROA3)].

Final Office Action 2, Jul. 28, 2016, for U.S. Appl. No. 13/801,976, filed Mar. 13, 2013 by M.B. Litherland et al., Total 21 pp. [57.308 (FOA2)].

Response to Final Office Action 2, Oct. 18, 2016, for U.S. Appl. No. 13/801,976, filed Mar. 13, 2013 by M.B. Litherland et al., Total 14 pp. [57.308 (RFOA2)].

Notice of Allowance, Jan. 13, 2017, for U.S. Appl. No. 13/801,976, filed Mar. 13, 2013 by M.B. Litherland at al., Total 15 pp. [57.308 (NOA)].

\* cited by examiner

SECURE MATCHING SUPPORTING FUZZY DATA

FIELD

Embodiments of the invention relate to secure matching supporting fuzzy data.

BACKGROUND

In the domain of information integration, data quality is important for master data management, data warehousing, system consolidation projects, etc. Information integration identifies duplicate data records, either within a source or across multiple data sources. Also, some data may need to be stored and/or processed securely.

Various data masking and encryption techniques may be applied to secure the data. For example, alteration techniques shuffle the order of values within a column, but leave the original values untouched. This retains data quality issues, such as typos on the individual values. As another example, A Secure Hashing Algorithm (SHA)-2 is a hashing function that is used to provide encryption of data. SHA-2 is currently considered collision-free, which means that two different input values are mapped to two different output values. As a consequence, a data quality metric like uniqueness can still be checked for on SHA-2 encrypted values because if the source value set was unique, due to the collision-free characteristic, the encrypted value set will be unique as well. However, on the encrypted data, information related to typos and other data quality issues in the data may be lost.

Some systems use probabilistic matching procedures. For probabilistic matching, scores for two or more records are computed, measuring how similar they are. The matching process usually considers multiple attributes, and each of the attributes has a different weight regarding the outcome of the overall score (e.g., a date of birth field may have more weight then a middle name field due to its higher significance if the same/similar value is found across two records). The weight assignment for each attribute is part of the configuration of the matching procedure. For each comparison of an attribute across two or more records, rules can be specified such as:

Ignore x number of typos (e.g., Labt instead of LbaT is treated as the same if one typo is permitted, and, thus, would yield exact match for this attribute)

Compare value of field on UPPERCASE/lowercase representation only

For date fields with US and European date formats of MM-DD-YEAR versus DD-MM-YEAR, consider values in date attributes as being the same if switching from US to European date format (or vice versa) would make the date fields look the same, which means exchanging the order of DD and MM in the overall value.

Some systems address the fuzzy matching logic problem on encrypted keyword data by implementing a limited wildcard character syntax for a given keyword value, where each conceivable wildcard permutation of a given keyword is encrypted and placed in an index (e.g., cat, c % t, ca %,% at). This approach dictates that each keyword and all wildcard permutations are to be generated, encrypted, and indexed prior to a search, since each permutation of a given word is indexed.

SUMMARY

Provided is a method for secure matching supporting fuzzy data. A first bloom filter for a first data element is retrieved, wherein each of the characters in the data element has been encrypted with a beginning offset position of the character and encrypted with an end offset position of the character to produce two encrypted values that are added to the first bloom filter. A second bloom filter for a second data element is retrieved. The first bloom filter and the second bloom filter are compared to determine whether there is a match between the first data element and the second data element.

Provided is a computer program product for secure matching supporting fuzzy data. The computer program product comprises a computer readable storage medium having program code embodied therewith, the program code executable by at least one processor to: retrieve, by the at least one processor, a first bloom filter for a first data element, wherein each of the characters in the data element has been encrypted with a beginning offset position of the character and encrypted with an end offset position of the character to produce two encrypted values that are added to the first bloom filter; retrieve, by the at least one processor, a second bloom filter for a second data element; and compare, by the at least one processor, the first bloom filter and the second bloom filter to determine whether there is a match between the first data element and the second data element.

Provided is a computer system for secure matching supporting fuzzy data. The computer system includes one or more processors, one or more computer-readable memories, and one or more computer-readable, tangible storage devices and program instructions, stored on at least one of the one or more storage devices for execution by at least one of the one or more processors via at least one of the one or more memories, to:

retrieve a first bloom filter for a first data element, wherein each of the characters in the data element has been encrypted with a beginning offset position of the character and encrypted with an end offset position of the character to produce two encrypted values that are added to the first bloom filter; retrieve a second bloom filter for a second data element; and compare the first bloom filter and the second bloom filter to determine whether there is a match between the first data element and the second data element.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
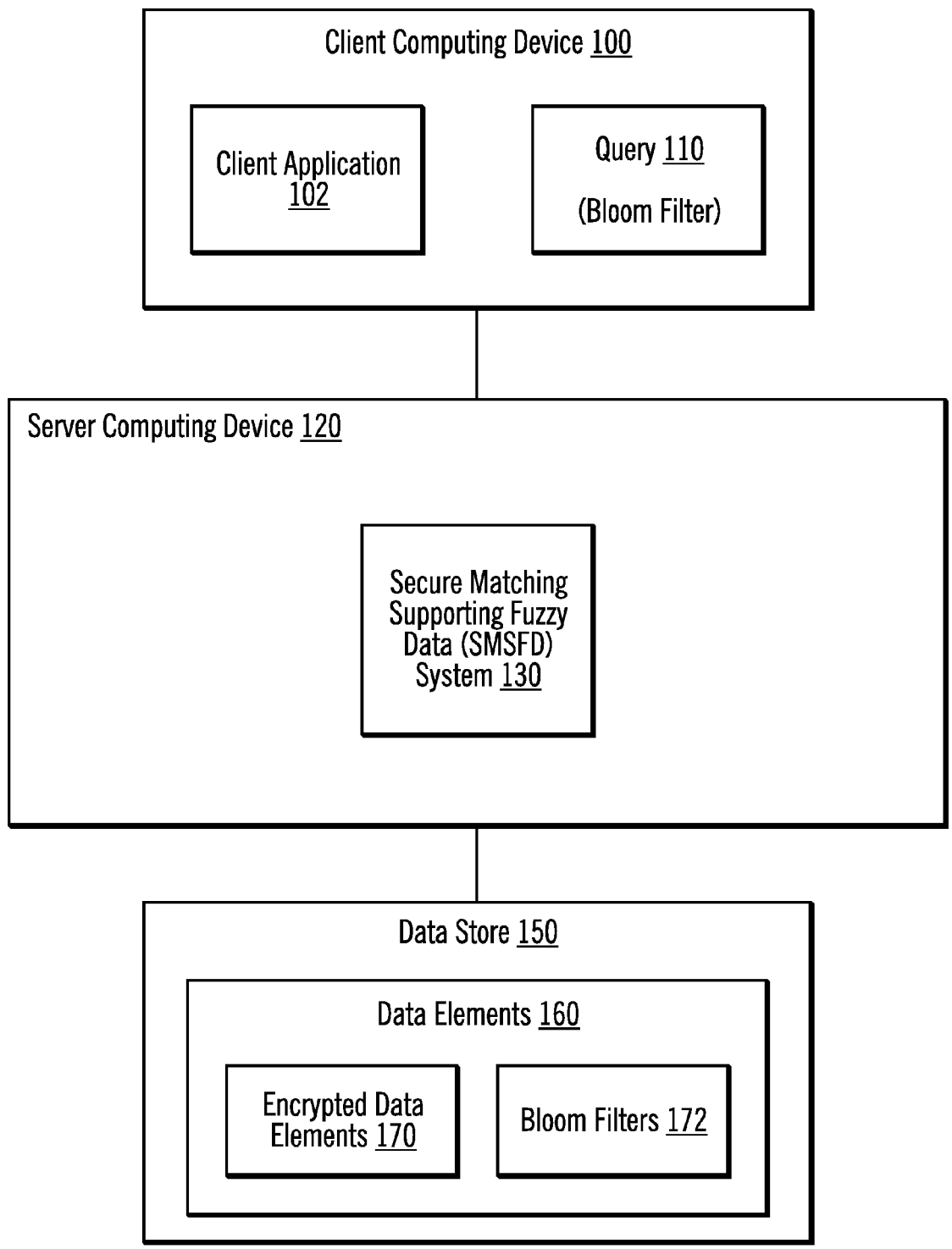
FIG. 1 illustrates a computing architecture in accordance with certain embodiments.

FIG. 1 illustrates a computing architecture in accordance with certain embodiments. A client computing device 100 is coupled to a server computing device 120. The client computing device 100 includes at least one client application 102 that issues a query 110 (in the form of a bloom filter) to the server computing device 120. The server computing device 120 includes the Secure Matching Supporting Fuzzy Data (SMSFD) system 130.

In certain embodiments, the SMSFD system 130 includes an Application Programming Interface (API) that receives the query 110 from the client application 102.

In certain embodiments, the client application 102 creates the bloom filter. For example, a search expression is submitted by a user of the client application 102 with a string comparison syntax specific query (e.g., regular expression (regex), standard string match, wildcard, etc.), and the client application 102 converts the search expression into one or more bloom filters. The client application 120 submits the one or more bloom filters coupled by logical operations (AND operators, OR operators or a combination of these) to the SMSFD system 130 at the server computing device 120. This prevents the actual search terms from being available to the SMSFD system 130, while the query is being evaluated by the SMSFD system 130. Thus, the SMSFD system 130 does not receive an unencrypted query.

For a given character in a search term, 1) the given character is coupled with the relative offset of that given character from a beginning of the search term and encrypted together to produce a single encrypted value, and 2) the given character is coupled with the relative offset of that given character from an end of the search term and encrypted together to produce a single encrypted value. Thus, there are N*2 encrypted values (where N represents the number of characters). So for each given character, there are two encrypted values that are placed into a bloom filter.

In certain embodiments, the secret base character offset is mutually agreed upon by authorized parties. In certain alternative embodiments, a secret base character offset is randomly generated.

The server computing device 120 is coupled to a data store 150. The data store 150 includes data elements 160 (e.g., one or more search terms), and at least some of the data elements 160 are encrypted data elements 170 with associated bloom filters 172. The SMSFD system 130 compares bloom filters to determine whether search terms represented by those bloom filters match based on fuzzy matching.

In certain embodiments, for each encrypted data element persisted in 170, there is a bloom filter 172 used for comparison against bloom filters submitted as queries by the client application 102. The encrypted data elements 170 may be encrypted by standard encryption techniques (e.g., symmetric or asymmetric techniques). So for each data element stored in 170, there are two encryptions 1) one as a bloom filter 172 for comparisons with other bloom filters, and 2) one as encrypted data elements 170 using standard encryption for returning back to the client application 102. The client application 102 may perform further processing to eliminate false positives or elements that were considered a match by the SMSFD system 130 but that further filtering using (e.g., regular expression (regex), standard string match, wildcard, etc.) deemed not a match. The client application 102 may also perform decryption of any returned encrypted data elements 170.

In certain embodiments, the SMSFD system 130 is implemented in a map-reduce architecture.

The bloom filters generated for other search terms may have been generated and stored before receiving the query or may be generated after receiving the query.

Fuzzy data may be described as any data that is not cleansed and standardized and, thus, may be incomplete, incorrect, inconsistent, in a wrong format or may contain any other error in the data. Matching may be described as the ability to detect duplicated information in two or more records in a record set. Fuzzy matching may be described as probabilistic matching techniques that have the ability to identify reliably duplicate records even when the data records contain attributes with fuzzy data.

The SMSFD system 130 supports fuzzy matching on a securely encrypted data element, where comparisons with the data element using a devised string comparison technique utilize a bloom filter as the basis for comparison. A bloom filter may be described as a data structure with entries for storing indicators. In certain embodiments, the data structure is an array, and the indicators are bits.

In certain embodiments, each entry in the bloom filter is composed of an encrypted pair value, and the encrypted pair value is composed of a character value of the data element at a given relative offset and an offset position value with respect to the beginning or ending offset of the data element. In certain embodiments, the beginning (base) offset position value is mutually agreed upon between authorized parties (e.g., between users using the client computing device 100 and the server computing device 120) and is a shared secret between the authorized parties. In certain embodiments, the number of entries produced is N*2 where N is the number of characters in the data element.

Due to data privacy legislation, sensitive data has to be masked/encrypted/otherwise protected (e.g. alteration techniques) so that during development, test, and production, users with the appropriate privileges are able to access the information (and users without such privileges are not able to access the information). For example, a developer may not have privileges to access credit card, Social Security Number (SSN), date of birth, health related information, etc. while developing information integration code. The SMSFD system 130 uses test data with the same data quality characteristics as the production data.

With the rise of cloud computing, companies are also looking at performing information integration development, test, and production processing using cloud environments. In the case of public cloud services for information integration, the SMSFD system 130 allows the sensitive portions of data to be secure.

Fuzzy matching includes: investigating, standardizing, matching, and deduplicating (e.g., survivorship/merge).

In the investigate process, the data is lexically analyzed. For example, the following values in a street address may be parsed into 4 tokens:

St. James St. 134:
  St.—either short for Saint or Street
  James—unique name for a street
  St.—either short for Saint or Street
  134—numerical—candidate for house number
St. James Str. 134:
  St.—either short for Saint or Street
  James—unique name for a street
  Str.—short for Street
  134—numerical—candidate for house number Applying the semantic context of the tokens, the investigate process may suggest the following three attributes by correctly interpreting the first two tokens representing the street name, as well as, by being able to detect that St. and Str. are likely in both cases to indicate the street type "street" (rather than avenue, road, etc.):

St. James St. 134:
   Street name: St. James
   Street type: Street
   House number: 134
St. James Str. 134:
   Street name: St. James
   Street type: Street
   House number: 134

For the tokenization of the input value into tokens and the ability to correctly identify "St." and "Str". as abbreviations for the street type "street", information inherent in the data itself is exploited (e.g., whitespace as token separator).

For the standardization, based on the patterns detected, the standardized output of the standardization process will look like the following for the two examples above:
   St. James St. 134: Saint James (in an attribute street) Street (in an attribute street type) 134 (in an attribute house number)
   St. James Str. 134: Saint James (in an attribute street) Street (in an attribute street type) 134 (in an attribute house number)

The number of attributes increased from 1 to 3 in with investigation and standardization.

With such standardized output, the SMSFD system 130 performs fuzzy matching and deduplication.

In particular, the embodiments use bloom filters and the notion of data element/offset position pairs on which encryption using bloom filters are applied, where the offset position is measured to beginning and end, creating two encrypted values. With embodiments, the client application 102 sets indicators for the offset positions in entries of the bloom filter. Then, for the fuzzy matching, the SMSFD system 130 performs logical operations between bloom filters.

Figure 2:
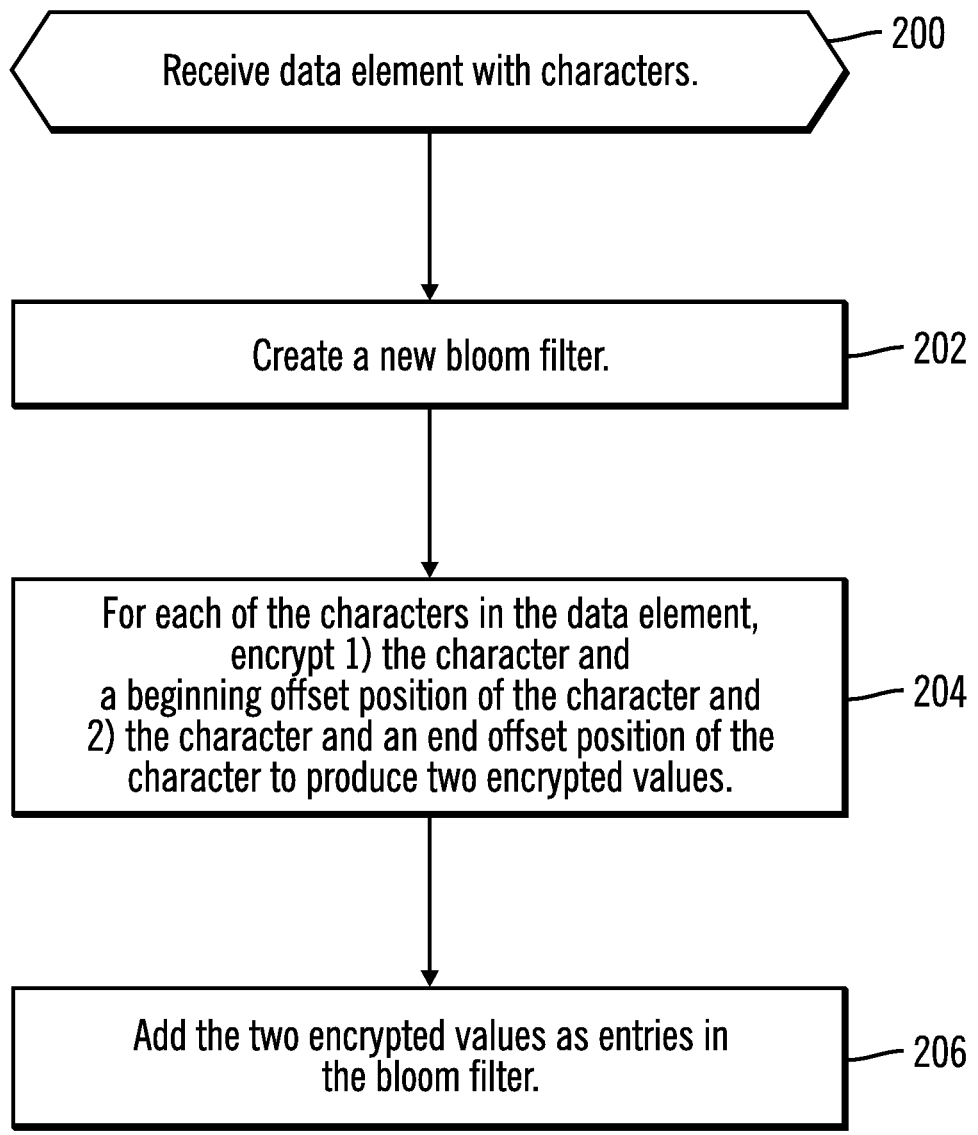
FIG. 2 illustrates, in a flow diagram, operations performed to generate a bloom filter with entries in accordance with certain embodiments.

FIG. 2 illustrates, in a flow diagram, operations performed to generate a bloom filter with entries in accordance with certain embodiments. Control begins at block 200 with the client application 102 receiving a data element having characters. In block 202, the client application 102 creates a bloom filter. In block 204, for each of the characters in the data element, the client application 102 encrypts 1) the character and a beginning offset position of the character and 2) the character and an end offset position of the character to produce two encrypted values. The beginning offset position defines a character's position relative to the beginning of the data element. The end offset position defines a character's position relative to the end of the data element. In block 206, the client application 102 adds the two encrypted values as entries in the bloom filter.

Figure 3:
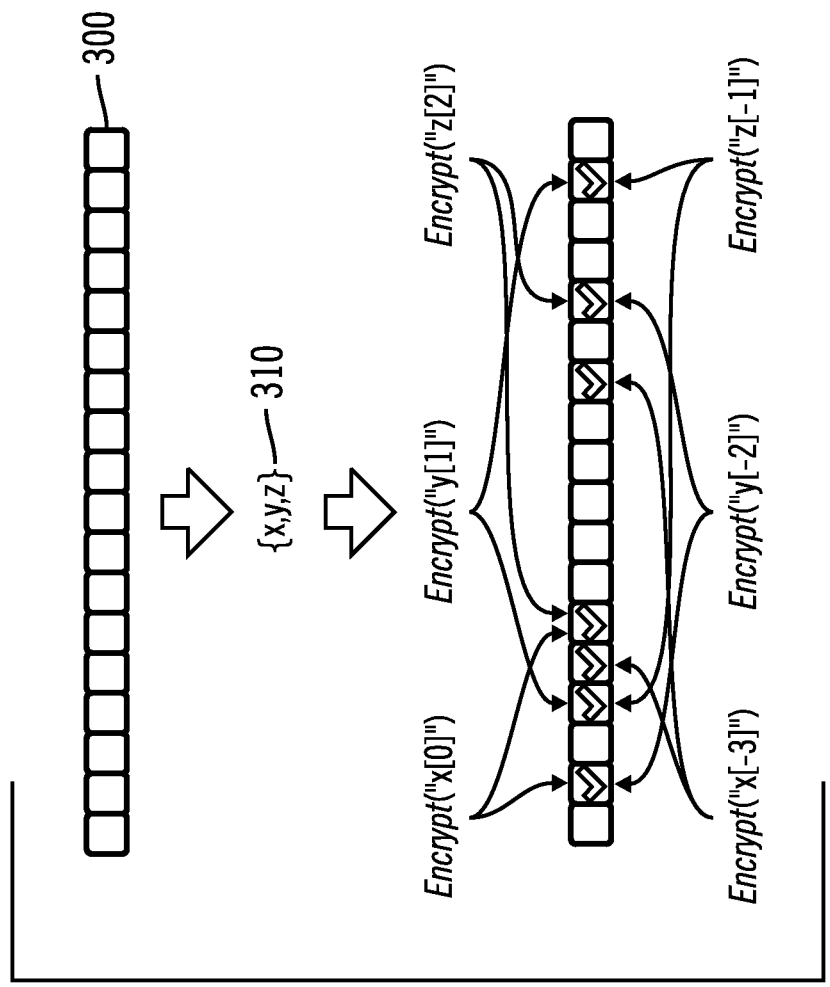
FIG. 3 illustrates an example of a bloom filter with entries in accordance with certain embodiments.

FIG. 3 illustrates an example of a bloom filter 300 with entries in accordance with certain embodiments. Initially, a bloom filter 300 is created for a data element 310, having characters "x", "y", and "z". In the example of FIG. 3, the characters "x", "y", and "z" are encrypted based on a beginning offset from a beginning of the data element, where the beginning offset position is zero based, and this encryption is represented as "x[0]", "y[1]", and "z[2]". In the example of FIG. 3, the characters "x", "y", and "z" are encrypted based on an end offset from an end of the data element, and this encryption is represented as "x[−3]", "y[−2]", and "z[−1]". Thus, the client application 102 encrypts the characters and their beginning offset positions and encrypts the characters and their end offset positions, resulting in six encrypted values. Then, the six encrypted values are added to the bloom filter. In certain embodiments, adding the encrypted values to the bloom filter results in indicators (e.g., bits) of the bloom filter being set.

Although the example of FIG. 3 shows the indicators in the bloom filter being set based on encryption of the characters and the beginning offset, as well as, encryption of the characters and the end offset, in certain embodiments, either the beginning offset or the end offset is used.

In certain embodiments, the SMSFD system 130 performs a fuzzy match comparison against a bloom filter (which may be described as an encrypted data element), without having access to the encryption key used to create the data element and without having knowledge of the beginning or end base character offset position that serves as a secret key between authorized parties.

Figure 4:
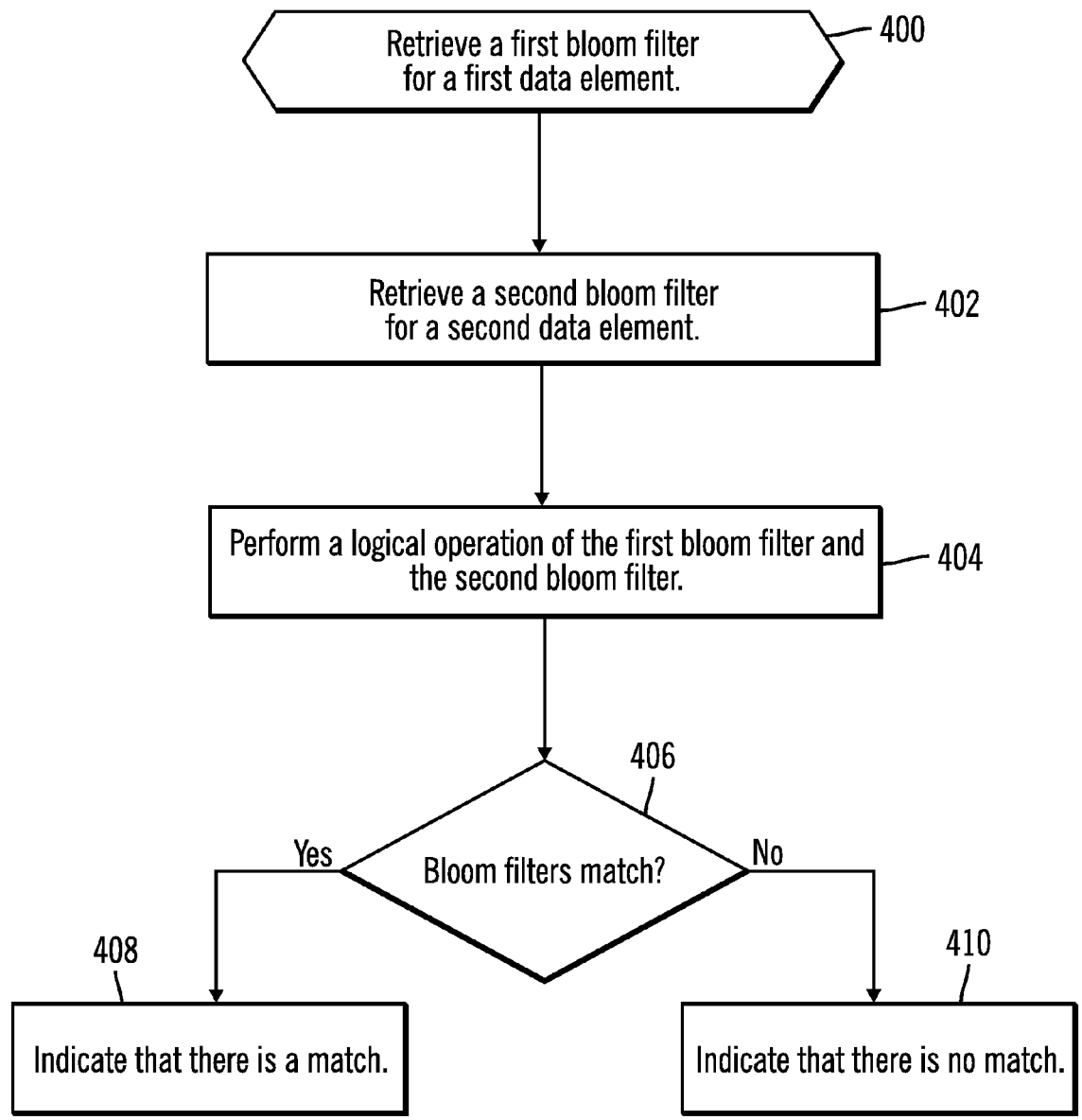
FIG. 4 illustrates, in a flow diagram, operations performed for fuzzy matching in accordance with certain embodiments.

FIG. 4 illustrates, in a flow diagram, operations performed for fuzzy matching in accordance with certain embodiments. Control begins at block 400 with the SMSFD system 130 retrieving a first bloom filter for a first data element (e.g., one or more search terms) received in a query. The first bloom filter would have been created using the processing of FIG. 2. In block 402, the SMSFD system 130 retrieves a second bloom filter for a second data element. The second bloom filter would have been created using the processing of FIG. 2. In certain embodiments, one or more client applications (at the same or different client computing devices) send the first bloom filter and the second bloom filter to the SMSFD system 130 for comparison.

In block 404, the SMSFD system 130 performs a logical operation of the first bloom filter and the second bloom filter. In certain embodiments, the SMSFD system 130 performs the logical operation based on indicators in the first bloom filter and indicators in the second bloom filter. In certain embodiments, the processing of block 404 generates a third bloom filter.

In block 406, the SMSFD system 130 determines whether the first bloom filter and the second bloom filter match. If so, processing continues to block 408, otherwise, processing continues to block 410. In block 408, the SMSFD system 130 indicates that there is a match. In certain embodiments, if there is a match, SMSFD system 130 returns the second data element (associated with the second bloom filter) to the client application 102, and the client application 102 may decrypt the second data element (e.g., one or more search terms) and eliminate a false positive (e.g., via re-evaluation of unencrypted search terms from the query and from the decryption). In block 410, the SMSFD system 130 indicates that there is no match.

In certain embodiments, the indicators are bits, and the comparison is a bitwise AND operation or a bitwise OR operation, and, if the bit array resulting from the bitwise operation equals the bits in the first bloom filter (e.g., the query), then the SMSFD system 130 determines that there is a match.

The processing of FIG. 4 may be performed any number of times to compare the first bloom filter to other bloom filters.

In certain embodiments, the SMSFD system 130 may provide a user interface supporting graphical configuration of the matching. Configuring the matching procedures includes identifying under which circumstances values are still considered equal. Example rules, include, but are not limited to: a number of permissible typos, equality if format is converted (e.g., US versus European dates), etc. In addition, weights that contribute to the overall match score may be set. Embodiments provide a user interface to enable a user to provide such rules and weights.

Figure 5:
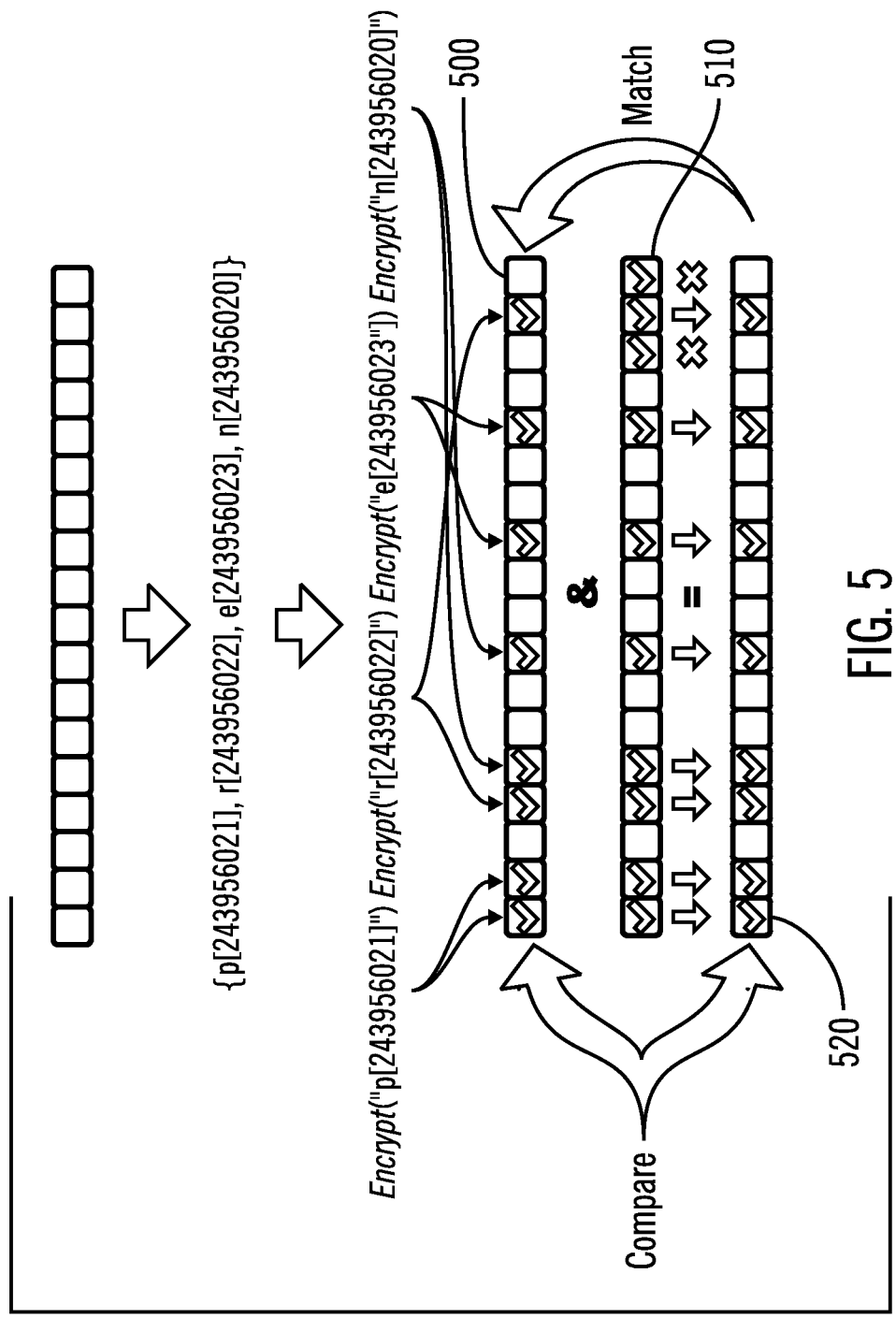
FIG. 5 illustrates an example of a bloom filter comparison in accordance with certain embodiments.

FIG. 5 illustrates an example of a bloom filter comparison in accordance with certain embodiments. In FIG. 5, a user is searching for a word that starts with 'pre' and ends with 'n'. The secret base character offset in this example is 243956021. Thus, 243956021 is the secret key between authorized parties. The relative offset position is based on 243956021.

In FIG. 5, the client application 102 generates a first bloom filter 500 by encrypting "pre" and "n" and their offset positions and sends the first bloom filter 500 to the SMSFD system 130. The SMSFD system 130 compares the first bloom filter 500 to a second bloom filter 510 (sent from the client application 102 or some other entity), and the result is a third bloom filter 520. Because the third bloom filter 520 matches the first bloom filter 500, the SMSFD system 130 indicates to the client application 102 that the first bloom filter and the second bloom filter match.

In certain embodiments, the SMSFD system 130 uses two or more bloom filters for a query. In such embodiments, an OR operation may be used for the comparison.

The following is an example of using two bloom filters that are submitted with a query to determine matches within a data store. In this example, a user wants to search for all records in the data store that contain a word that starts with 'co' and ends with 'tion'. Using this as the basis for a query, two bloom filters are constructed. The secret base offset in this example is 99. The following is the processing to create the query:

1. encrypt the value/position c/99 and add as an entry to 'bloom filter 1'
2. encrypt the value/position o/100 and add as an entry to 'bloom filter 1'
3. encrypt the value/position t/95 and add as an entry to 'bloom filter 2'
4. encrypt the value/position i/96 and add as an entry to 'bloom filter 2'
5. encrypt the value/position o/97 and add as an entry to 'bloom filter 2'
6. encrypt the value/position n/98 and add as an entry to 'bloom filter 2'

Then, the SMSFD system 130 submits a Boolean 'AND' query using 'bloom filter 1' and 'bloom filter 2' as operands (e.g., <bloom filter 1>AND<bloom filter 2>).

In this example, the query is the logical representation of the query and may be further optimized by performing a bitwise OR of the two operands and submitting a single bloom filter as the constraint as the 'AND' operation is effectively stating that all bits turned on (1) in both bloom filters need to be on in other bloom filters that are used in comparisons.

In certain embodiments, the SMSFD system 130 uses phonetics. Furthermore, to support even more fuzziness, phonetic algorithms may be applied to create for names, addresses, etc. a phonetic representation. For example, in German language the last names "Sehger" and "Seeger" cannot be differentiated if spoken because, in both cases, the spoken version has a long "ee" audible after the S, but both spellings are valid representations of a last name. So in the matching procedure, additional comparisons may be performed using the phonetic representations of values. The phonetic representation of "Sehger" and "Seeger" would be the same, so comparing the values for these two on the phonetic value would be an exact match; whereas, the comparison on the original values "Sehger" and "Seeger" would lead to a non-exact match (with one letter difference).

In certain embodiments, the SMSFD system 130 supports secure, fuzzy matching in cloud computing environments. In certain embodiments, the SMSFD system 130 supports secure, fuzzy matching if developers are not supposed to see the original data due to legislation and/or data privacy concerns.

Embodiments do not impose a specific fuzzy matching syntax, and so the equivalent logic of most common string matching algorithms may be implemented, where the underlying comparison logic ultimately relies on comparison on a character/offset position by character/offset position basis.

Embodiments uses the offset positional information that is encrypted along with each character and the random beginning base offset value only shared by authorized parties. Since only authorized parties are privy to the beginning base offset used during encryption of a data element, a brute force attack on the character set would have to consider the offset position as well. Depending on the possible numeric range used to represent the beginning base offset, it would become increasingly difficult to determine the corresponding encrypted output of a given character at the correct offset position with any degree of certainty. The process of placing the encrypted character/offset position within a bloom filter further obfuscates the true identity, as bits in a bloom filter bit array can be "shared" and, thus, various combinations of bits within the bit array become ambiguous as each bit may help represent multiple entries within the bloom filter. This is a product of the probabilistic nature of the bloom filter where false positives are expected to a certain degree.

Thus, embodiments stipulate a way of augmenting data elements to be encrypted so that the data elements can still be compared probabilistically.

Cloud Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
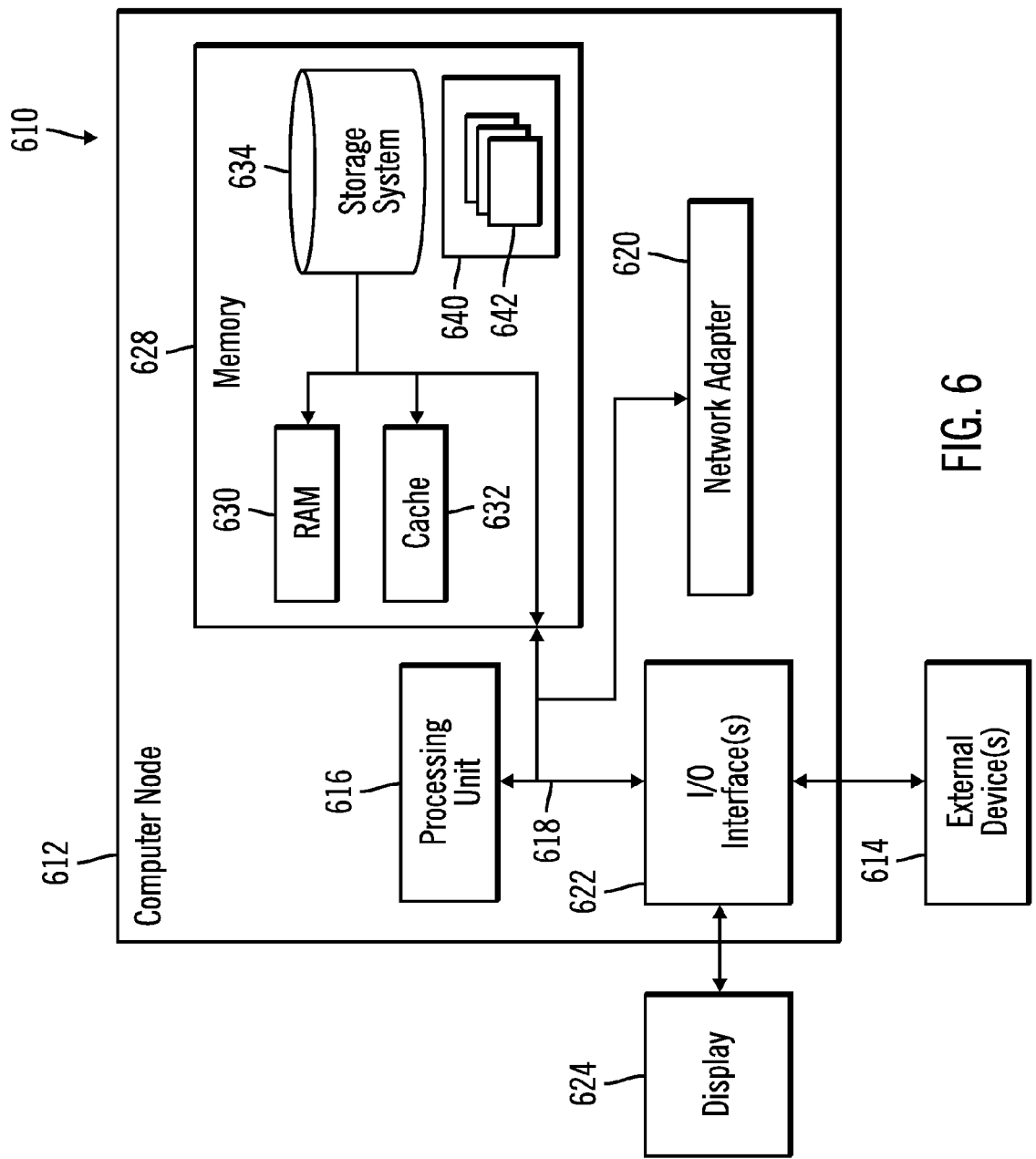
FIG. 6 illustrates a cloud computing node in accordance with certain embodiments.

Referring now to FIG. 6, a schematic of an example of a cloud computing node is shown. Cloud computing node 610 is only one example of a suitable cloud computing node and is not intended to suggest any limitation as to the scope of use or functionality of embodiments of the invention described herein. Regardless, cloud computing node 610 is capable of being implemented and/or performing any of the functionality set forth hereinabove.

In cloud computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in cloud computing node 610 is shown in the form of a general-purpose computing device. The components of computer system/server 612 may include, but are not limited to, one or more processors or processing units 616, a system memory 628, and a bus 618 that couples various system components including system memory 628 to a processor or processing unit 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and it includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc.; one or more devices that enable a user to interact with computer system/server 612; and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Figure 7:
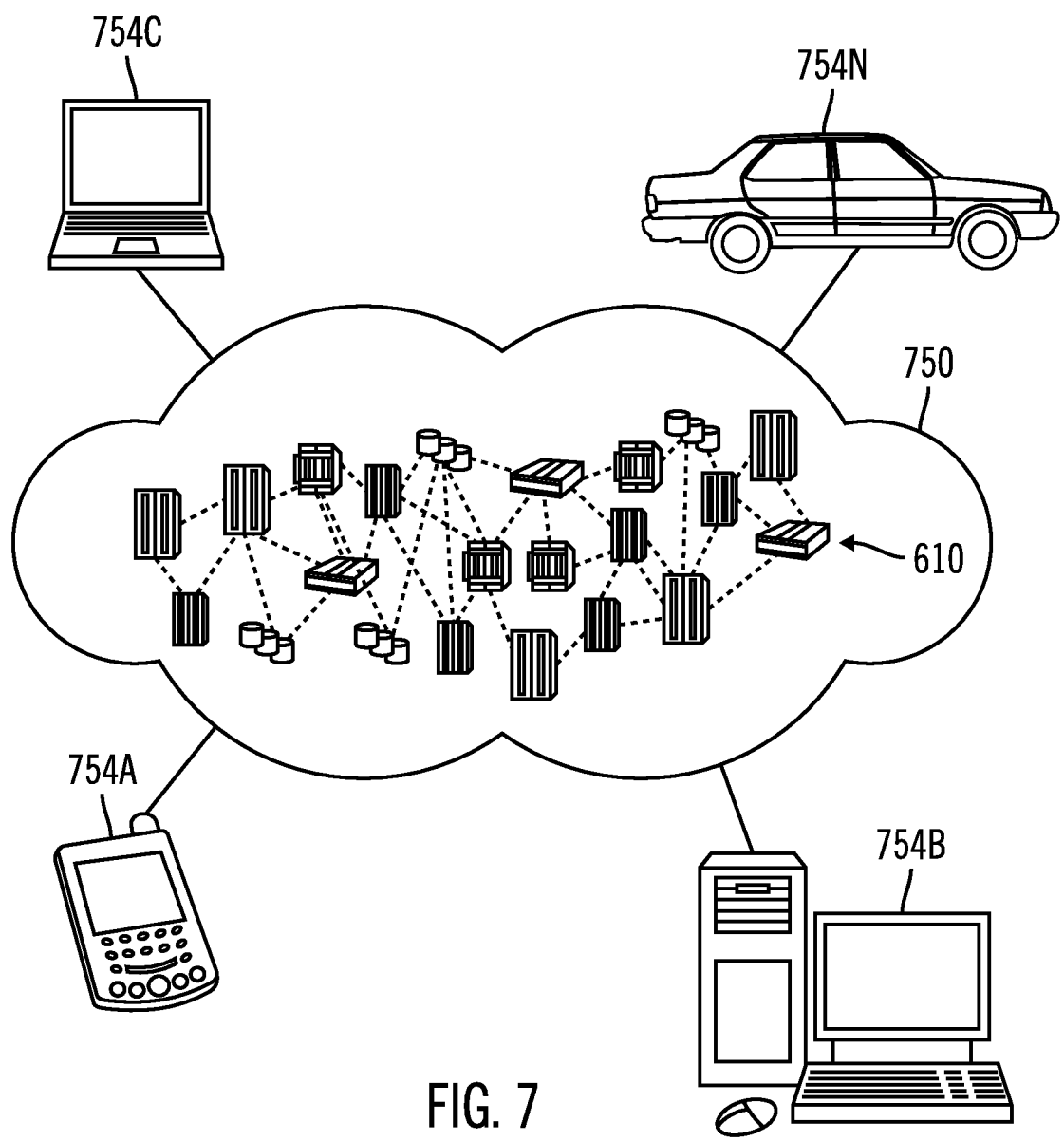
FIG. 7 illustrates a cloud computing environment in accordance with certain embodiments.

Referring now to FIG. 7, illustrative cloud computing environment 750 is depicted. As shown, cloud computing environment 750 comprises one or more cloud computing nodes 610 with which local computing devices used by cloud consumers, such as, for example, personal digital assistant (PDA) or cellular telephone 754A, desktop computer 754B, laptop computer 754C, and/or automobile computer system 754N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 610 and cloud computing environment 750 can communicate with any type of computerized device over any type of network and/or network addressable connection (e.g., using a web browser).

Figure 8:
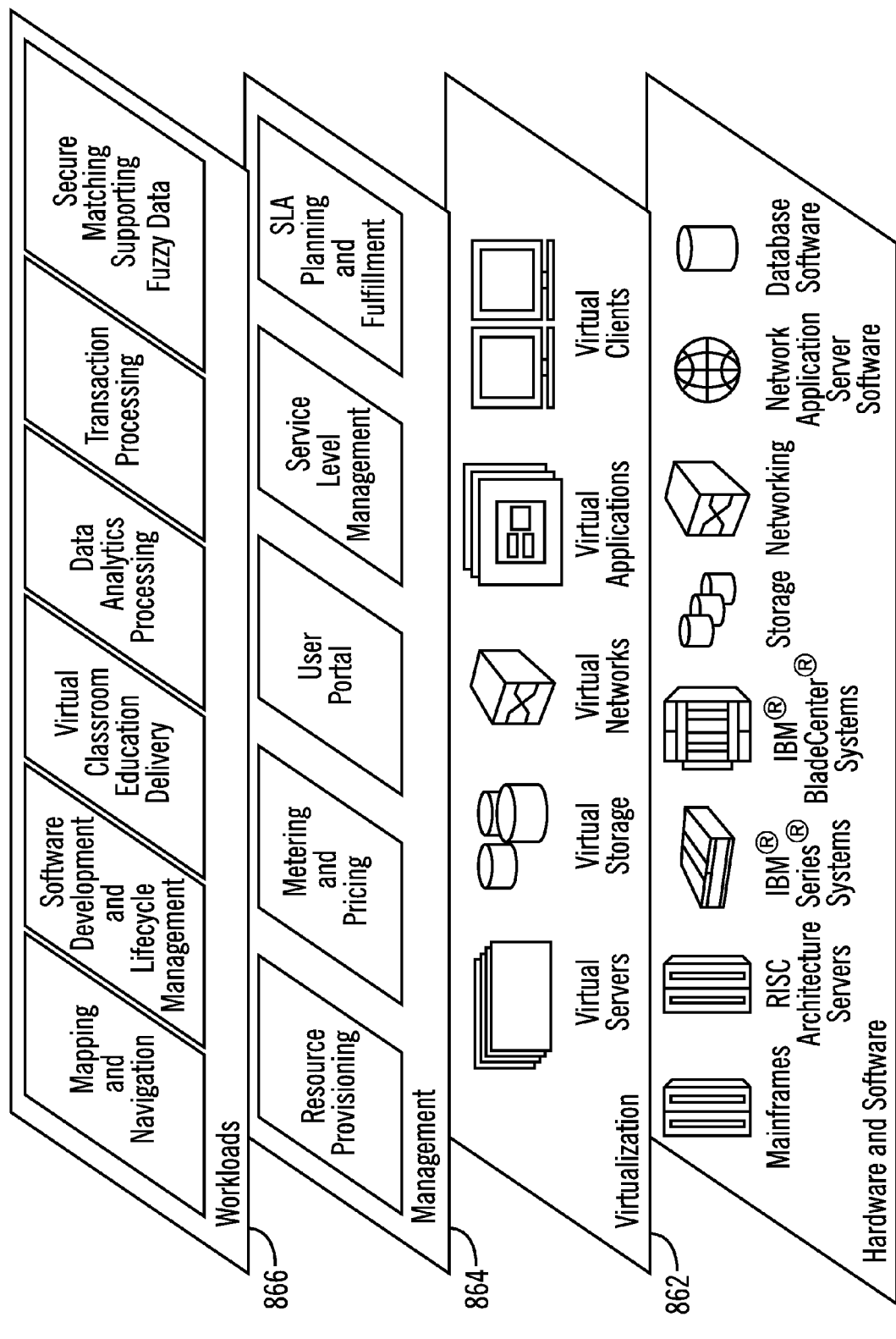
FIG. 8 illustrates abstraction model layers in accordance with certain embodiments.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual clients.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and secure matching supporting fuzzy data.

Thus, in certain embodiments, software or a program, implementing secure matching supporting fuzzy data in accordance with embodiments described herein, is provided as a service in a cloud environment.

In certain embodiments, the client computing device 100 and/or the server computing device 120 has the architecture of computing node 610. In certain embodiments, the client computing device 100 and/or the server computing device 120 is part of a cloud environment. In certain alternative embodiments, the client computing device 100 and/or the server computing device 120 is not part of a cloud environment.

In certain embodiments, the client computing device 100 is a "cloud gateway appliance". In such embodiments, users interface directly with the cloud gateway appliance in a private network that serves as a direct connect to the cloud.

In certain embodiments, the client computing device 100 is any computing device with the client application 102 loaded with an API to perform bloom filter search.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flow diagram (e.g., flowchart) illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowcharts illustration, can be implemented by special purpose hardware-based systems that perform the specified functions or acts, or combinations of special purpose hardware and computer instructions.

In addition, the illustrated operations of the flow diagrams and block diagrams show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The code implementing the described operations may further be implemented in hardware logic or circuitry (e.g., an integrated circuit chip, Programmable Gate Array (PGA), Application Specific Integrated Circuit (ASIC), etc. The hardware logic may be coupled to a processor to perform operations.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

What is claimed is:

1. A computer-implemented method, comprising:
   creating, using a processor of a computer, a first bloom filter for a first data element, wherein the first bloom filter includes an array with two encrypted values for each of multiple characters of the first data element, by encrypting each character of the multiple characters of the first data element with a beginning offset position to generate a first value of the two encrypted values and with an end offset position to generate a second value of the two encrypted values;
   creating, using the processor of the computer, a second bloom filter for a second data element, wherein the second bloom filter includes another array with two encrypted values for each of multiple characters of the second data element, by encrypting each character of the multiple characters of the second data element with a beginning offset position to generate a first value of the two encrypted values and with an end offset position to generate a second value of the two encrypted values;
   receiving, using the processor of the computer, a query with the first bloom filter, the second bloom filter, and a logical operation that indicates how the first bloom filter and the second bloom filter are combined;
   using fuzzy matching to compare, using the processor of the computer, the first bloom filter and the second bloom filter with the logical operation against data elements in a data store to determine whether there is a match to at least one of the data elements; and
   in response to determining that there is a match to at least one of the data elements, returning, using the processor of the computer, an indication that there is a match; and
   in response to determining that there is no match to at least one of the data elements, returning, using the processor of the computer, an indication that there is no match.

2. The method of claim 1, wherein the beginning offset position that is a first shared secret is randomly generated.

3. The method of claim 1, wherein the end offset position of the character that is a second shared secret is randomly generated.

4. The method of claim 1, wherein the logical operation comprises a combination of AND and OR operators.

5. The method of claim 1, wherein a Software as a Service (SaaS) is provided to perform method operations.

* * * * *